(12) United States Patent
Belhumeur et al.

(10) Patent No.: US 6,697,518 B2
(45) Date of Patent: Feb. 24, 2004

(54) ILLUMINATION BASED IMAGE SYNTHESIS

(75) Inventors: Peter Belhumeur, New York, NY (US); David Kriegman, Mahomet, IL (US); Athinodoros Georghiades, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 09/993,143

(22) Filed: Nov. 6, 2001

(65) Prior Publication Data

US 2002/0128060 A1 Sep. 12, 2002

Related U.S. Application Data

(60) Provisional application No. 60/252,805, filed on Nov. 22, 2000, and provisional application No. 60/249,470, filed on Nov. 17, 2000.

(51) Int. Cl.$^7$ ................................................. G06K 9/00
(52) U.S. Cl. ...................................... 382/154; 345/419
(58) Field of Search .......................... 382/154; 345/419, 345/420, 426, 427; 356/12; 250/235

(56) References Cited

U.S. PATENT DOCUMENTS 5,028,802 A * 7/1991 Webb et al. ................ 250/235
5,479,279 A   12/1995 Barbier et al.

OTHER PUBLICATIONS

Georghiades, et al., "Illumination–based synthesis: Creating Novel Images of Human Faces Under Differing Pose and Lighting", *IEEE Workshop*, pp. 47–54, (Jun. 26, 1999).
Yuille, A. L. et al., "Determining Generative Models of Objects under Varying Illumination: Shape and Albedo from Multiple Images using SVD and Integrability," Jul. 5, 1999.
Zongker, Douglas E. et al., "Environment Matting and Compositing," 1999.
Chuang, Yung–Yu et al., "Environment Matting Extensions: Towards Higher Accuracy and Real–Time Capture."
Epstein, R., "Learning Object Representations from Lighting Variations."
Georghiades, A.S. et al., "Illumination–Based Image Synthesis: Creating Novel Images of Human Faces Under Differing Pose and Lighting," 1999, IEEE Workshop on Multi–View Modeling and Analysis of Visual Scenes.
Georghiades, A.S. et al., "Illumination Cones for Recognition Under Variable Lighting: Faces," 1998, IEEE Conf. On Computer Vision and Pattern Recognition.
Georghiades, Athinodoros S. et al., "From Few to Many: Generative Models for Recognition Under Variable Pose and Illumination."
Kriegman, David J. et al., "Representations for Recognition Under Variable Illumination."
Kriegman, David et al., "Shape and Enlightenment: Reconstruction and Recognition under Variable Illumination," 1999, ISRR.
Belhumeur et al., "The Bas–Relief Ambiguity", International Journal of Computer Vision, (Earlier version appeared in CVPR, 1997, pp. 1060–1066).

* cited by examiner

*Primary Examiner*—Samir Ahmed
*Assistant Examiner*—Vikkram Bali
(74) *Attorney, Agent, or Firm*—Fish & Richardson P.C.

(57) ABSTRACT

Construction of a three dimensional model of an object based on images of the object being illuminated by different regions of a display in sequence. The images are obtained by a camera facing a direction relatively the same as the display, and the camera is at a relatively fixed position in relation to the object. Construction of the three dimensional model includes finding an estimate of a set of light source vectors representing the different illuminated regions of the display, and finding an estimate of the shape and albedo of the object based on the estimated set of light source vectors.

32 Claims, 4 Drawing Sheets

ILLUMINATION BASED IMAGE SYNTHESIS

CROSS-REFERENCE TO RELATED APPLICATION

This application claims priority to U.S. Provisional Application No. 60/249,470, which was filed on Nov. 17, 2000 and titled "Constructing 3-D Models of Objects from Images with Varying Light Source Positions", and U.S. Provisional Application No. 60/252,805, which was filed on Nov. 22, 2000 and titled "Constructing 3-D Models of Human Faces Using a Monitor as a Light Source".

TECHNICAL FIELD

This invention relates to image processing.

BACKGROUND

To construct a realistic two dimensional (2-D) image of an object under arbitrary viewing angles and lighting conditions, a three dimensional (3-D) model of the object is first constructed.

To construct the 3-D model, the surface geometry and reflectance functions of the object need to be determined. The surface geometry of the object can be determined by finding the surface normal vectors of the object. The reflectance functions of the object can be modeled in several ways. One approach is to assume the surface to be Lambertian, and to find the albedo of the surface based on this assumption. Albedo is the fraction of incident light that is reflected by the surface of the object. A Lambertian surface is defined such that when a light ray shines on a point on the surface, the reflected luminous intensity in any direction from that point is proportional to the cosine of the angle between the direction of the light ray and the surface normal vector at that point. To obtain the 2-D image under arbitrary lighting conditions, the brightness of each point on the 3-D surface is first obtained by multiplying vectors representing the incident light rays with the surface normal vectors and the albedo. The 3-D surface with the correct brightness is then projected onto a 2-D plane perpendicular to the viewing direction to show a realistic 2-D image of the object.

To determine the surface normal vectors and albedo of an object, information of the object can be gathered from images taken from one or more cameras. Because a 2-D image of an object lacks depth information, multiple images are required to resolve the ambiguity as to the depth of each portion on the surface. The images may be taken by a camera from different viewing angles, or by a camera situated at a single location but with different lighting conditions.

The images may also be taken by a camera at a single location with the same lighting condition but with the object turned at different angles.

SUMMARY

In general, in one aspect, the invention is directed towards a method for constructing a three dimensional model of an object by illuminating different regions of a display in sequence, obtaining a set of images of the object being illuminated by the different regions, and constructing the three dimensional model of the object based on the set of images.

In general, in another aspect, the invention features a system for constructing a three dimensional model of an object. The system includes a display for showing an illuminated region at different positions on the display in sequence, a camera for obtaining a set of images of an object being illuminated by the illuminated region shown at different positions, and a processor for constructing a three dimensional model of the object based on the set of images.

In general, in another aspect, the invention features a computer program stored on a computer-readable media for causing a computer system to perform the functions of illuminating different regions of a display in sequence, obtaining a set of images of an object being illuminated by the different regions of the display, and constructing a three-dimensional model of the object from the set of images.

In general, in another aspect, the invention features a system for playing a video game. The system includes a display for showing illuminated regions in sequence at different positions on the display, a camera for obtaining a set of images of a user being illuminated by the illuminated regions at different positions on the display, and a processor for constructing a three dimensional model of the user based on the set of images and composing representations of the user within the video game based on the three dimensional model.

In general, in another aspect, the invention features a method of playing a video game by illuminating different regions of a display in sequence, obtaining a set of images of a user being illuminated by the different regions of the display, constructing a three dimensional model of the user based on the set of images; and composing representations of the user within the video game based on the three dimensional model.

Implementations of the invention may include one or more of the following features. The different regions include at least three different regions on the display. The step of constructing the three dimensional model further includes finding an estimate of a set of light source vectors representing the different illuminated regions, and finding an estimate of the shape and albedo of the object based on the estimated set of light source vectors. An ambiguity in the estimate of the shape is resolved by transforming an estimated shape to a transformed shape that is consistent with a pre-calibrated exemplar constructed from a set of objects similar to the object being modeled. The ambiguity in the estimate of the shape is further resolved by enforcing integrability on the data representing the shape of the object. The set of images is obtained by a camera that is facing a direction relatively the same as the display, the camera is at a relatively fixed position in relation to the object, and the object is relatively still. The object can be a human face.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
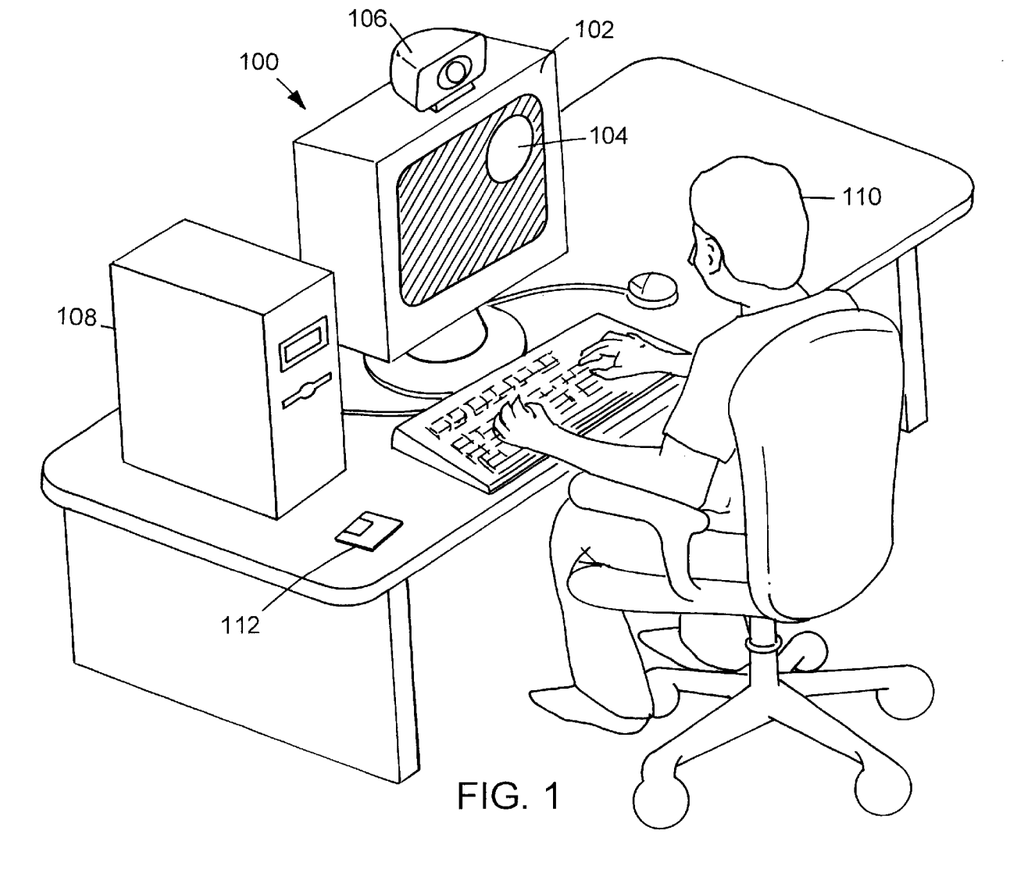
FIG. 1 shows a system for constructing a 3-D model of a user.

Referring to FIG. 1, an imaging system 100 includes a general purpose display 102 used to display textual and graphical information, and a digital camera 106 for capturing images of a user 110 facing the camera and the display. Display 102 shows an illuminated region 104 that illuminates the user, and camera 106 captures light reflected from the user to produce digitized images of the user. Camera 106 sends the digitized images to a memory or a disk drive in a computer 108 for storage and subsequent image processing. Computer 108 controls where illuminated region 104 is shown on display 102, and controls camera 106 to capture an image of the user each time after illuminated region 104 is shown at a different position on display 102.

In operation, display 102 first shows an image of the user obtained by camera 106. Display 102 also shows a message directing the user to adjust his or her position so that a clear image of his or her face is obtained by camera 106, and to maintain his or her position for a few seconds after hitting a key on a keyboard of computer 108 to start an image capture procedure described below.

Figure 2A:
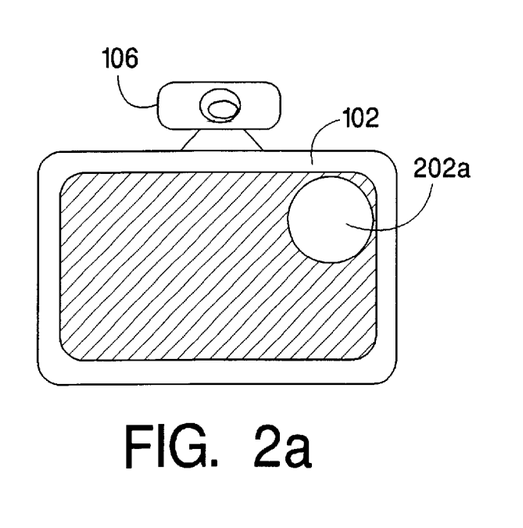
FIGS. 2a–2c show illuminated regions on a display.
Figure 2B:
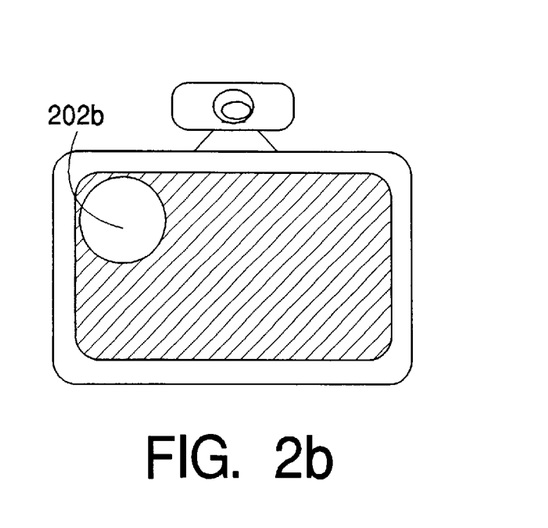
Figure 2C:
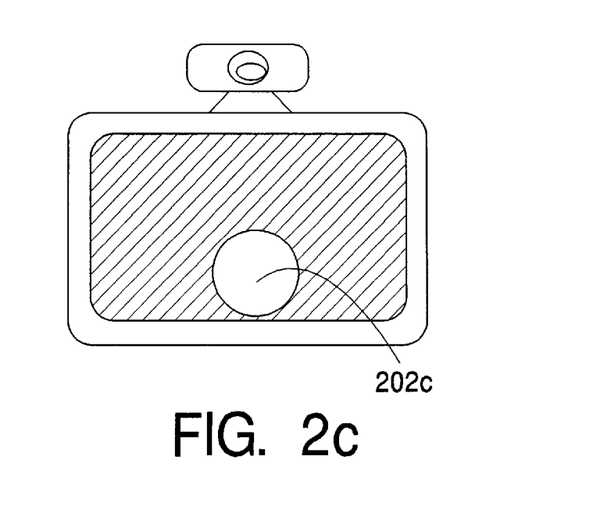

Referring to FIGS. 2a–2c, computer 108 controls display 102 to illuminate an upper right region 202a of the display 102 against a dark background. Computer 108 controls camera 106 to capture light reflected from the user and generate a first digitized image of the user being illuminated by region 202a. Each pixel of the first digitized image represents the brightness of the surface of the user being illuminated by the upper right region 202a. Camera 106 sends the first digitized image to computer 108 for storage. Computer 108 then controls display 102 to illuminate an upper left region 202b of display 102 against a dark background. Camera 106 generates a second digitized image of the user being illuminated by region 202b, and sends the second digitized image to computer 108 for storage. Computer 108 then controls display 102 to illuminate a central lower region 202c of the display 102 against a dark background. Camera 106 generates a third digitized image of the user being illuminated by region 202a, and sends the third digitized image to computer 108 for storage. By illuminating different regions on display 102, imaging system 100 obtains images of the user being illuminated under different lighting conditions. The images of the user are taken with low ambient light so that the differences between images of the user illuminated by the different regions of display 102 will be significant.

After images of the user are stored in computer 108, the computer executes a computer program stored on a computer readable media, such as the hard drive or a floppy diskette 112. The program implements a model construction and image synthesis algorithm to process the images, construct a three dimensional model of the user's face, and synthesize images based on the three dimensional model. Computer 108 constructs accurate 3-D models of the user by choosing a 3-D model that is consistent both with the measured irradiance of the images captured by camera 106 and with an average 3-D model as determined by a pre-calibrated exemplar stored in computer 108. To achieve this, an iterative estimation method is used to estimate a 3-D model with shape and albedo that best fit the captured images. This is equal to solving a minimization problem.

The pre-calibrated exemplar used in the model construction and image synthesis algorithm is constructed from a database of multiple images of multiple people. Use of pre-calibrated exemplars removes the burden of knowing the light sources positions and strengths. Thus, the brightness and positions of the illuminated regions 202a, 202b, 202c on display 102 are not critical. The size and position of the display does not need to be known. The position of camera 106 is also not critical. There is no need to calibrate the positions of the camera, the light source, or the user with respect to one another. There is also no need to calibrate the light source position and strength.

In the following, a general description of an illumination based model construction and image synthesis method is given, followed by a description of the steps carried out in the model construction and image synthesis algorithm. Next, an example of a 3-D model constructed from seven images of a person's face and images synthesized based on the 3-D model are given.

Illumination Based Model Construction and Image Synthesis

Three-dimensional models of an object, including a human face, can be constructed from images in which the object is illuminated by light sources of varying position and strength. An accurate 3-D model of the object is constructed by choosing the 3-D model that is consistent both with the measured irradiance of the input images and with an average 3-D model as determined by a pre-calibrated exemplar.

The description below assumes that the surface of the object is convex and that it follows the Lambertian reflection rule. The method can be applied even when these assumptions are not met.

Let the surface of an object be modeled by a height function $z(x, y)$, where $(x, y)$ denotes a Euclidean coordinate system in the image plane of a camera. Let the albedo of the surface of the user be denoted by $\alpha(x, y)$. Let vector field $b(x, y)$ denote the product of the albedo $\alpha(x, y)$ with the inward pointing surface normal:

$$b(x, y) = \alpha(x, y) \frac{(z_x(x, y), z_y(x, y), -1)}{\sqrt{z_x^2(x, y) + z_y^2(x, y) + 1}} \qquad \text{(Equ. 1)}$$

where $z_x(x, y)$ and $z_y(x, y)$ are the x- and y-derivatives of the height function $z(x,y)$.

Assume that the object is illuminated by a single point source, and that the camera captures an n pixel image of the surface of the object. Let the image be denoted by the vector $1 \in R^n$. Note that the image is written as a vector with each pixel corresponding to an element $l_j$ of the vector 1. A pixel $l_j$ samples the image irradiance at some point in the image plane as specified by its Euclidean coordinates $(x_j, y_j)$. Let $B \in R^{n \times 3}$ be a matrix where each row is given by the vector $b(x_j, y_j)$.

A point light source at a great distance from the object can be represented by a vector $s \in R^3$ representing the product of the light source intensity with a unit vector in the direction of the light source. The coordinate system of the light source is given by the 3-D Euclidean coordinate system established by the image plane and its normal. Let $W \in R^{n \times n}$ be a binary diagonal matrix with diagonal entry $W_{jj}=1$ if pixel $l_j$ is not in shadow and $W_{jj}=0$ if pixel $l_j$ is in shadow. A surface with Lambertian reflectance, with normals and albedo as specified by B, illuminated by s, produces an image 1 given by $$1 = W B s \qquad \text{(Equ. 2)}$$

where the operation on the right in the above equation is standard matrix multiplication.

Acquire k (three or more) images of the object by fixing the object's position relative to the camera and moving the light source position before each acquisition. Let the acquired set of images be denoted by matrix $L=[1_1, \ldots, 1_k]$ with $l_{ji}$ be the value of the j-th pixel in the i-th image. Let the unknown light source positions be denoted by $S \in R^{3 \times k}$ matrix whose columns, $s_i$, are the light source directions scaled by their corresponding source intensities for all k images. To determine the shape and albedo of the object, B needs to be extracted from L. If none of the image pixels are shadowed, singular value decomposition (SVD) can be used to find a matrix $B^*$ that best (in a least-squares sense) fits the collection of images. This task is equivalent to the following minimization problem:

$$\min_{B^*,S} \| L - B^*S \|_F \qquad \text{(Equ. 3)}$$

where $\| \cdot \|_F$ is the Frobenius norm. Note that even if there exists an exact solution to the above minimization, the recovered $B^*$ will in general not be the desired B. The two matrices will differ by an unknown linear transformation, i.e., $B^* = BA$ where $A \in GL(3)$. For any light source, $$l = Bs = (BA)(A^{-1}s). \qquad \text{(Equ. 4)}$$

If shadows are present, using SVD in the above procedure leads to an inaccurate estimate of $B^*$ due to the presence of shadows. Therefore, an alternative method is needed to find $B^*$, one that takes into account the fact that some data values are invalid and should not be used in the estimation. For the purpose of this estimation, any invalid data will be treated as missing measurements. The minimization problem stated in Equation 3 is then reformulated as $$\min_{B^*,S} \| M * (L - B^*S) \|_F \qquad \text{(Equ. 5)}$$

where the * operation denotes corresponding matrix element multiplication, and M is a n×k matrix with element $$m_{ji} = \begin{cases} 1 & \text{if } l_{ji} \text{ is a valid pixel measurement,} \\ 0 & \text{otherwise.} \end{cases}$$

Due to the ambiguity in Equation 4, the inaccuracies in the assumptions about the reflectance of the object's surface, and the noise in the measurement process, the matrix $B^*$ that minimizes the above equation differs from the true B.

To resolve the ambiguities from Equation 4, it is necessary to find a matrix $A^*$ of the form $$A^* = \begin{bmatrix} 1 & 0 & 0 \\ 0 & 1 & 0 \\ \alpha_1 & \alpha_2 & \alpha_3 \end{bmatrix} \qquad \text{(Equ. 6)}$$

that best transforms $B^*$ to some average exemplar of the class of objects that is being modeled. Let $B^E$ be the matrix of inward pointing surface normals scaled by the albedo for the average exemplar of a class of objects. A matrix $B^{**} = B^*A^*$ is then calculated, where $$A^* = \operatorname*{argmin}_{A^*} \| B^E - B^*A^* \|_F. \qquad \text{(Equ. 7)}$$

The other parameters of the ambiguity from Equation 4 are determined by enforcing integrability. The technique used to solve the minimization problem in Equation 5 guarantees that integrability is satisfied in the estimate of $B^{}$. By enforcing integrability, the matrix $B^{}$ is consistent with the normals of a surface. Furthermore, enforcing integrability inherently leads to more accurate estimates because there are fewer parameters (or degrees of freedom) to determine.

The estimation algorithm is iterative. To enforce integrability, the possibly non-integrable vector field induced by the current estimate of $B^{**}$ is, in each iteration, projected down to the space of integrable vector fields, or gradient fields. The surface $\bar{z}(x, y)$ is expanded using basis surfaces (functions) into $$\bar{z}(x_j, y_j; \bar{c}(w)) = \Sigma \bar{c}(w) \phi(x_j, y_j; w) \qquad \text{(Equ. 8)}$$

where $w = (u, v)$ is a two dimensional index over which the sum is performed, and $\{\phi(x_j, y_j; w)\}$ is a finite set of basis functions which are not necessarily orthogonal. The discrete cosine basis is chosen so that $\{\bar{c}(w)\}$ is the full set of discrete cosine transform (DCT) coefficients of $\bar{z}(x_j, y_j)$.

The partial derivatives of $\bar{z}(x, y)$ can also be expressed in terms of this expansion, giving $$\bar{z}_x(x_j, y_j; \bar{c}(w)) = \Sigma \bar{c}(w) \phi_x(x_j, y_j; w) \qquad \text{(Equ. 9)}$$

and $$\bar{z}_y(x_j, y_j; \bar{c}(w)) = \Sigma \bar{c}(w) \phi_y(x_j, y_j; w). \qquad \text{(Equ. 10)}$$

Since the partial derivatives of the basis functions, $\phi_{x\,(xj,\,yj;\,w)}$ and $\phi_y(x_j, y_j; w)$, are integrable and the expansions of $\bar{z}_x(x_j, y_j)$ and $\bar{z}_y(x_j, y_j)$ share the same coefficients $\bar{c}(w)$, it is easy to see that the partial derivatives of $\bar{z}(x_j, y_j)$ are guaranteed to be integrable as well, and thus, $\bar{z}_{xy}(x_j, y_j) = \bar{z}_{yx}(x_j, y_j)$.

After the estimate $B^{}$ is found, the partial derivatives $z_x^{}(x_j, y_j)$ and $z_y^{}(x_j, y_j)$ can be found using Equation 1. The estimate $B^{}$ and the partial derivatives $z_x^{}(x_j, y_j)$ and $z_y^{}(x_j, y_j)$ may be non-integrable. The partial derivatives $z_x^{}(x_j, y_j)$ and $z_y^{}(x_j, y_j)$ can also be expressed as a series, giving $$z_x^{}(x_j, y_j; c_1^{}(w)) = \Sigma c_1^{**}(w) \phi_x(x_j, y_j; w) \qquad \text{(Equ. 11)}$$

and $$z_y^{}(x_j, y_j; c_2^{}(w)) = \Sigma c_2^{**}(w) \phi_y(x_j, y_j; w). \qquad \text{(Equ. 12)}$$

Note that in general $c_1^{}(w) \neq c_2^{}(w)$, which implies that $z_{xy}^{}(x_j, y_j) \neq z_{yx}^{}(x_j, y_j)$.

Assume that $z_x^{}(x_j, y_j)$ and $z_y^{}(x_j, y_j)$ are known from an estimate of $B^{}$, then it is possible to find $\bar{z}_x(x_j, y_j)$ and $\bar{z}_y(x_j, y_j)$, a set of integrable partial derivatives, which are as close as possible to $z_x^{}(x_j, y_j)$ and $z_y^{**}(x_j, y_j)$, respectively, in a least-squares sense. This is achieved by solving the following:

$$\min_{\bar{c}} \sum_{x_j y_j} (\bar{z}_x(x_j, y_j; \bar{c}) - z_x^{}(x_j, y_j; c_1^{}))^2 + \qquad \text{(Equ. 13)}$$

$$(\bar{z}_y(x_j, y_j; \bar{c}) - z_y^{}(x_i, y_i; c_2^{}))^2.$$

In other words, integrability is enforced on a set of possibly non-integrable partial derivatives, $z_x^{}(x_j, y_j)$ and $z_y^{}(x_j, y_j)$, by finding the least-squares fit of integrable partial derivatives $\bar{z}_x(x_j, y_j)$ and $\bar{z}_y(x_j, y_j)$. Notice that to obtain the surface $\bar{z}(x_j, y_j)$, it is only necessary to perform the inverse 2-D DCT on the coefficients $\bar{c}(w)$.

Model Construction and Image Synthesis Algorithm

The above procedure is incorporated into the following model construction and image synthesis algorithm. The data matrix for k images of an individual is defined as $L = [l_1 \ldots, l_k]$. If there were no shadowing, L would be rank 3 (assuming no image noise), and SVD could be used to factor L into $L = B^*S$ where S is a 3×k matrix whose columns, $s_i$, are the light source directions scaled by their corresponding source intensities for all k images.

Because the images have cast and attached shadows, and possibly saturations, it is necessary to first determine which data values do not satisfy the Lambertian assumption. A pixel is labeled as being in shadow if its value divided by its corresponding albedo is below a threshold. The average of the modeling images is used as an initial estimate of the albedo. A conservative threshold is then chosen to determine shadows so that few or no invalid data is included in the estimation process. A trade-off is made by throwing away a few valid measurements. Any invalid data, including shadows and saturations, are treated as missing measurements. The steps carried out in the model construction and image synthesis algorithm are as follows:

Step 1: Find the average of the modeling (or training) images and use it as an initial estimate of the albedo, $\alpha(x_j, y_j)$.

Step 2: Without doing any row or column permutations, sift out all the full rows (with no missing measurements) of matrix L to form a full sub-matrix $\hat{L}$. The number of rows in $\hat{L}$ is almost always larger than its number of columns, k.

Step 3: Perform SVD on $\hat{L}$ to find an initial estimate of matrix $S \in R^{3 \times k}$ which best spans the row space of $\hat{L}$.

Step 4: Find B* using the minimization in Equation 5 with the S matrix fixed at its current estimate.

Step 5: Find A* (defined in Equation 6) as $$A^* = \underset{A^*}{\operatorname{argmin}} \| B^E - B^* A^* \|_F$$

and compute $B^{**} = B^* A^*$ and $S^* = (A^*)^{-1} S$.

Step 6: Estimate a possibly non-integrable set of partial derivatives $z_x^{}(x_j, y_j)$ and $z_y^{}(x_j, y_j)$ by using the rows of $B^{**}$ for the values of $b(x, y)$ in Equation 1.

Step 7: Estimate (as functions of $\bar{c}(w)$) a set of integrable partial derivatives $\bar{z}_x(x_j, y_j)$ and $\bar{z}_y(x_j, y_j)$ by the minimization in Equation 13.

Step 8: Update the albedo $\alpha(x_j, y_j)$ using the previously estimated matrix S* and the partial derivatives $\bar{z}_x(x_j, y_j)$ and $\bar{z}_y(x_j, y_j)$ by the following least-squares minimization $$\min_{\alpha(x_j,y_j)} \sum_i m_{ji} \left| l_{ji} - < \alpha(x_j, y_j) \frac{(\bar{z}_x(x_j, y_j), \bar{z}_y(x_j, y_j), -1)}{\sqrt{\bar{z}_x^2(x_j, y_j) + \bar{z}_y^2(x_j, y_j) + 1}}, s_i^* > \right|^2$$

where $l_{ji}$ is the intensity of the j-th pixel in the i-th image, $s_i^*$ is the i-th column of S*, and $$m_{ji} = \begin{cases} 1 & \text{if } l_{ji} \text{ is a valid pixel measurement,} \\ 0 & \text{otherwise.} \end{cases}$$

Step 9: Construct $\bar{B}$ using the newly calculated albedo $\alpha(x_j, y_j)$ and the partial derivatives $z_x(x_j, y_j)$ and $z_y(x_j, y_j)$ in Equation 1.

Step 10: Update each of the light source directions and strength $s_i^*$ independently using the newly constructed $\bar{B}$ in the following least-squares minimization $$\min_{s_i^*} \| m_i * (l_i - \bar{B} s_i^*) \|,$$

where $l_i$ is the i-th image, $m_i$ is the i-th column of matrix M, and the * operation denotes corresponding matrix element multiplication. Set S=S*

Step 11: Repeat steps 4–10 until the estimates converge.

Step 12: Perform inverse DCT on the coefficients $\bar{c}(w)$ to get the 3-D surface $\bar{z}(x_j, y_j)$.

In most cases where the images of the user are without excessive shadows, the above calculations converge within 10–15 iterations.

A Matlab program used to implement the algorithm is listed in Appendix A.

To construct color models and synthesize color images, a color camera (e.g., one with red, green, and blue signal outputs) is used to capture images of the object being illuminated by white regions on the display. Because white light contains red, green and blue colors, each image acquired by the camera captures the three color components of the surface of the object. Thus, the same number of images can be used in the color 3-D model reconstruction as in the case with gray-scale (black and white) images.

Each color image contains three components, $1^r, 1^g, 1^b$, corresponding to the three basic colors. To construct a 3-D model of the object, the three components of each image are added together on a pixel-by-pixel basis to form a gray-scale image, $1 = (1^r + 1^g + 1^b)/3$. The set of gray-scale images $L = [1_1 \ldots, 1_k]$ is then used to estimate the surface $\bar{z}(x_j, y_j)$, the gray-scale albedo $\alpha(x_j, y_j)$, and the light source directions using the model construction and image synthesis algorithm described above.

To estimate the red, green, and blue albedos, the minimization in step 8 of the model construction and image synthesis algorithm is used. For example, in order to find the red albedo $\alpha_r(x_j, y_j)$, the $\alpha(x_j, y_j)$ and $l_{ji}$ in the minimization of step 8 are replaced by $\alpha^r(x_j, y_j)$ and $l_{ji}^r$ respectively. The minimization is then performed over $\alpha^r(x_j, y_j)$. The same procedure is followed for the green and the blue albedos.

To synthesize color images of the object illuminated by an arbitrary color light source, the red, green, and blue albedo functions are weighted by the respective proportion of the red, green, and blue colors in the light source. The weighted albedos are then used to synthesize the three color components of the image.

Examples of Synthesized Images

Figures 3A, 3B:
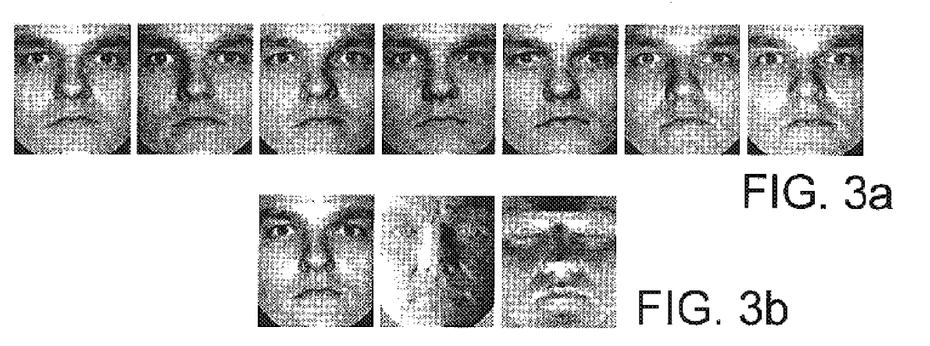
FIG. 3a shows images of a person.
FIGS. 3b–3c show synthesized images of the person.
Figure 3C:
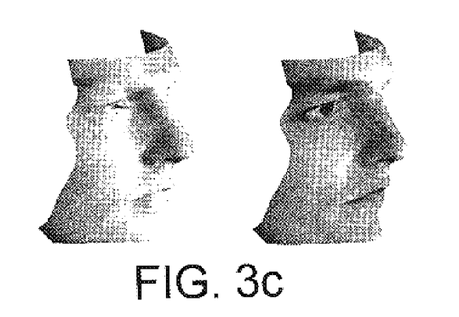

An example of a 3-D model of a person's face constructed by using the model construction and image synthesis algorithm is given below. Seven original images of the person's face were used in this example. FIG. 3a shows the seven original images of a face used in the estimate of $\bar{B}$. FIG. 3b shows the basis images of the estimated matrix $\bar{B}$. These basis images encode not only the albedo of the face (the fraction of reflected light) but also its surface normal field, and they can be used to construct images of the face under arbitrary illumination conditions. FIG. 3c shows the resulting 3-D model of the face $\bar{z}(x_j, y_j)$. On the left, the model was rendered with flat shading, i.e., the albedo was assumed to be constant across the surface. On the right, the third basis image of $\bar{B}$ has been texture-mapped on the model.

Figure 4:
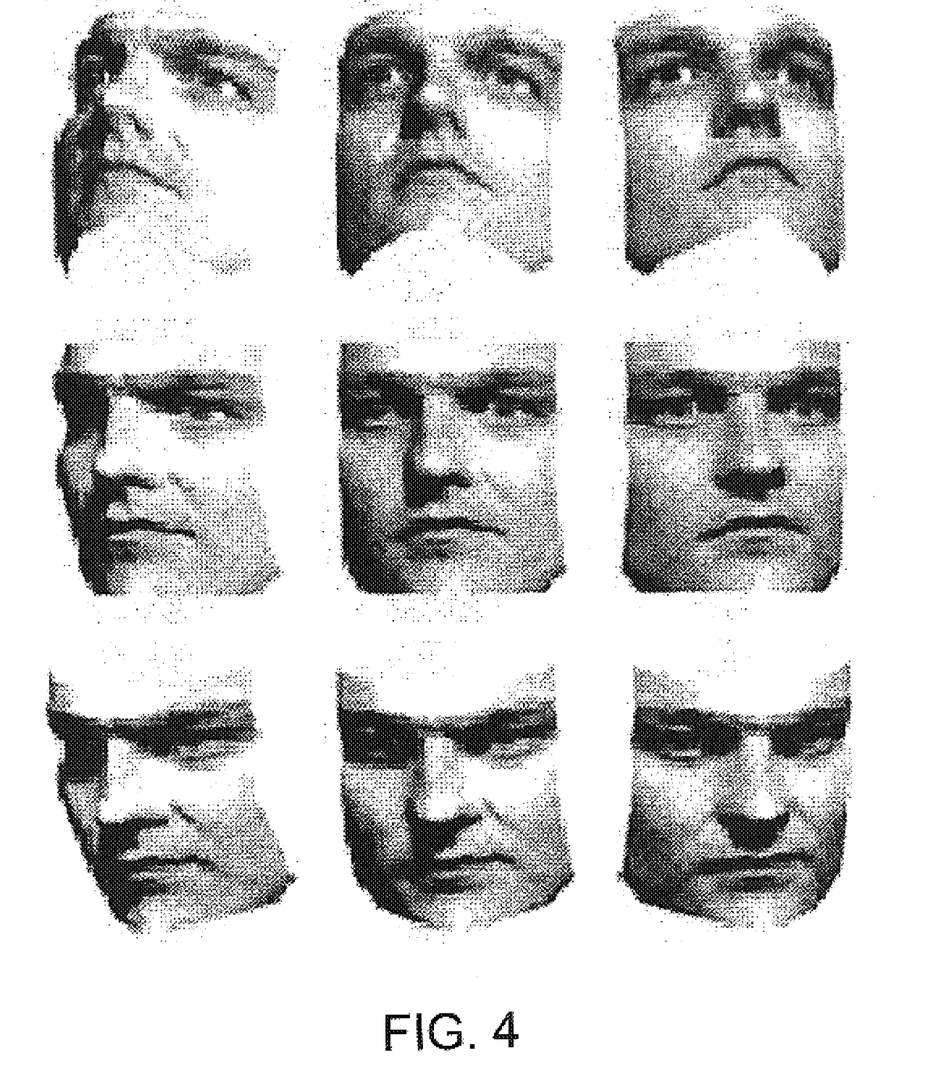
FIG. 4 shows synthesized images of the person.

Referring to FIG. 4, synthetic images of the face under novel pose and lighting are shown. These synthetic images generated from the seven images in FIG. 3a where the pose is fixed and the illumination exhibits only small, unknown variations. The synthetic images exhibit large variations in pose and a wide range in shading and shadowing. The simulated point light source in the images is fixed. Therefore, as the face moves around and its gaze direction changes with respect to the light source direction, the shading of the surface changes and both attached and cast shadows are formed.

A number of embodiments of the invention have been described. Nevertheless, it will be understood that various modifications may be made without departing from the spirit and scope of the invention. For example, images of an object other than a human face may be captured by the camera, and 3-D models of the object may be constructed according to the method described. The display can be any display device, including the display screen of a laptop computer, a handheld device, a television set, a video game console, or a kiosk monitor. The positions of the illuminated regions shown on the display may be varied. The illuminated regions can have shapes other than circles, such as bright squares that are shown at different corners of the display. In generating color 3-D models of the user, images acquired with color standards other than RGB, such as HSV, HSI, YES, YCrCb, YIQ, CIE XYZ, or CIE LUV, may be used.

The camera can be any image acquisition device with a resolution comparable to the desired resolution of the constructed 3-D models. These image devices include standard film-based still and movie cameras, digital cameras, and digital and analog camcorders. The imaging system may be used to construct 3-D models of people or objects for later recognition and verification. The pre-calibrated exemplar may be constructed from a database of 3-D range scans of multiple people. The databases for constructing the exemplar may or may not include the user. Other methods for model construction and image synthesis are described in the following papers:

1. A. Georghiades, P. Belhumeur, D. Kriegman, "Illumination-Based Image Synthesis: Creating Novel Images of Human Faces Under Differing Pose and Lighting," IEEE Workshop on Multi-View Modeling and Analysis of Visual Scenes, 1999, pp. 47–54.
2. A. Georghiades, P. Belhumeur, D. Kriegman, "From Few to Many: Generative Models for Recognition under Variable Pose and Illumination," IEEE Conf. on Automatic Face and Gesture Recognition, 2000, pp. 277–284.
3. D. Kriegman, P. Belhumeur, A Georghiades, "Representations for Recognition Under Variable Illumination," in Shape, Contour and Grouping in Computer Vision", D. A. Forsyth, J. L. Mundy, V. Gesu, R. Cipolla (Eds), Springer-Verlag, 1999, pp. 95–131.
4. D. Kriegman, P. Belhumeur, A. Georghiades, "Shape and Enlightenment: Reconstruction and Recognition under Variable Illumination," International Symposium on Robotics Research, October, 1999, pp. 79–88.
5. A. Georghiades, D. Kriegman, P. Belhumeur, "Illumination Cones for Recognition Under Variable Lighting: Faces," IEEE Conf. On Computer Vision and Pattern Recognition, 1998, pp. 52–59.

Accordingly, other embodiments are within the scope of the following claims.

APPENDIX A

```
% recon3D.m
% _ _ _ _ _
%
% function [B,S,Surf,coeffs,albedo,sD]=recon3D(X,Be,height,iters,tol,d)
%
%   AUTHOR: A. S. Georghiades
%     DATE: June 7, 1999
% PURPOSE:
%           Constructs a 3-D model of an object using still images of the
%           object seen under fixed pose but varying illumination. No knowledge
%           about the strength and position of the light sources is assumed.
%           The minimum number of images required is 3 (i.e., there are
%           at least 3 columns in X -- the image data matrix) . Note that
%           each n-pixel image has been reshaped into a vector of n elements.
%           Invalid image data in X, such as shadows and saturations, are
%           marked by the Matlab symbol 'NaN' (which means not-a-number).
%           The algorithm iterates until the rate of change of the cost
%           function is below 'tol' and until the number of iterations is
%           at least 'iters'. If 'd' equals 1 then in each iteration the
%           current surface estimate textured-mapped with the current estimate
%           of the albedo is displayed.
%           'Be' is the matrix of inward pointing surface normals scaled
%           by the albedo of the average exemplar of a class of objects.
%           'height' is just an integer denoting the height (in pixels)
%           of the original images.
%
function [B,S,Surf,coeffs,albedo,sD]=recon3D(X,Be,height,iters,tol,d)
if (rem(size(X,1),height)~=0),
    error('nipalsint: height not a multiple of number of pixels in the images.')
end
width=size(X,1)/height;
knownX=~isnan(X)
sufficientData=(sum(knownX')>2)';        % Hard-wired to a minimum of 3 measurements
                                         % per surface normal.
find (~sufficientData)
sD=sufficientData;
if (sum(sufficientData) <size (X,1)),
    disp('nipalsInt: Insufficient data to perform factorization.')
    return;
end
```

APPENDIX A-continued

```
%% Find initial estimate of S.
fullRows=(sum(knownX')==size (X,2))
numFull==sum (fullRows)
[uu,ss,vv]=svd(X(find(fullRows),:),0);
S=(vv(:,1:3)*sqrt(ss(1:3,1:3)))';
S=[S(2,:);S(3,:);S(1,:)];
Bt=zeros(size(X,1),3);
Bt(find(fullRows),:)=X(find(fullRows),:)/S;
for j=find(~fullRows),
    jp=find(knownX(j,:));
    b =((S(:,jp)')[X](j,jp)')'
    Bt(j,:)=b;
end
F=Bt[B]e;
if F(1,1)<0,
    S(1,:)=-S(1,:);
end
if F(2,2)<0,
    S(2,:)=-S(2,:);
end
%% Initial estimate of albedo.
Xz=X;
Xz(find(~knownX))=zeros(sum(~knownX(:)),1);
albedo=mean(Xz')/255;
B=zeros(size(X,1),3);
Surf=zeros(height,width);
[M,N]=meshgrid(0:width-1,0:height-1);
k=0;
phi=1e6;
criterion=1;
while ( k<iters | criterion>tol),
    tic
    %% Estimate B_star.
    B_star=zeros(size(X,1),3);
    B_star(find(fullRows),:)=X(find(fullRows),:)/S;
    for j=find(~fullRows),
        jp=find(knownX(j,:));
        b_star = ((S(:,jp)')[X](j,jp)')';
        B_star(j,:)=b_star;
    end
    %% Find A_star and compute B_star_star and S_star.
    BeB=Be-[B_star(:,1),B_star(:,2),zeros(size(B_star,1),1];
    v=B_star(:,3)[B]eB;
    A_star=[1 0 0; 0 1 0; v];
    B_star_star=B_star*A_star;
    S_star=A_starß;
    Q=B_star_star(:,1:3)./(albedo*ones(1,3));
    Q=Q./(Q(:,3)*ones (1,3));
    %% Estimate integrable partial derivatives.
    Q1=vec22mat(Q(:,1),height,width);
    Q2=vec22mat(Q(:,2),height,width);
    tQ1=dct(dstN(Q1')');
    tQ2=dstN(dct(Q2')');
    tq1=tQ1(:)
    tq2=tQ2(:)
    tq1(1)=[];
    tq2(1)=[];
    wx=M(:)*pi/width;
    wy=N(:)*pi/height;
    wx(1)=[];
    wy(1)=[];
    c=(-wx.*tq1-wy.*tq2)./(wx.^2 + wy.^2);
    C=vec22mat( [0;c],height,width);        % surface dct coefficients.
    WX=vec22mat([0;wx],height,width);
    WY=vec22mat([0;wy],height,width);
    iC1=idct(idstN((-WX.*C)')');
    iC2=idstN(idct((-WY.*C)')');
    B2=[iC1(:),iC2(:)]
    Bone=[B2,ones(height*width,1)];
    Bone=Bone./(sqrt(sum(Bone'.^2)')*ones(1,3));
%% Estimate albedo.
tX=Bone*S_star;
tXz=tX;
tXz(find(~knownX))=zeros(sum(~knownX(:)),1);
Xz=X;
Xz(find(~knownX))=zeros(sum(~knownX(:)),1);
albedo=sum(tXz'.*Xz')./sum(tXz'.*tXz')';
albedo(find(albedo<0.01))=0.01*ones(size(find(albedo<0.01)));
%% Construct B.
```

APPENDIX A-continued

```
    B=(albedo*ones(1,3)).*Bone;
%% Update light sources.
for j=1:size(S,2),
    jp=find(knownX(:,j));
    x=X(jp,j);
    s=inv(B(jp,:)'*B(jp,:))*(B(jp,:)'*x
    S(:,j)=s(1:3);
end
%% Display current extimate of surface.
coeffs=-C(:);
Surf=idct2(-C);
Surf=Surf-min(Surf(:));
if d,
    CC=255*reshape(albedo,height,width)/max(albedo);
    H1=surf(-M-1,N+1,Surf,(CC));
    colormap(qray(256)); axis square; axis on;
    set (H1, 'LineStyle','none');
    view (110,22.5)
    drawnow
end
k=k+1
hw=height*width;
sin(acos((B2(:)/norm(B2(:)))'*(Q(1:2*hw)')/norm(Q(1:2*hw)));
Xt=B*S;
sqrt(sum(sum(Xt(find(knownX)).^2)));
phiOld=phi;
phi=sqrt(sum(sum((X(find(knownX))-Xt(find(knownx))).^2)));
criterion=(phiOld-phi)/phiOld
    toc
end
    %%%%
function a = idst(b,n)
%IDST Inverse discrete sine transform.
%
%   X = IDST(Y) inverts the DST transform, returning the
%   original vector if Y was obtained using Y = DST(X).
%
%   X = IDST(Y,N) pads or truncates the vector Y to length N
%   before transforming.
%
%   If Y is a matrix, the IDST operation is applied to
%   each column.
%
%   See also: FFT,IFFT,DCT,DST.
%   Author(s): C. Thompson, 2-12-93
%            S. Eddins, 10-26-94, revised
%   copyright (c) 1988-97 by The MathWorks, Inc.
%   $Revision: 1.14 $ $Date: 1997/02/06 21:54:12 $
%   Modified by ASG from IDOT to IDST. 1999/06/02
%   References:
%   1) A. K. Jain, "Fundamentals of Digital Image
%      Processing", pp. 150-153.
%   2) Wallace, "The JPEG Still Picture Compression Standard",
%         Communications of the ACM, April 1991.
error (nargchk(1,2,nargin));
if min(size(b))==1
    if size(b,2)>1
        do_trans = 1;
    else
        do_trans = 0;
    end
    b = b(:);
else
    do_trans = 0;
end
if nargin==1,
    n = size (b,1);
end
m = size(b,2);
%   Pad or truncate b if necessary
if size(b,1)<n,
    bb = zeros(n,m);
    bb(1:size(b,1),:) =b;
else
    bb(1:size(b,1),:) = b;
end
if rem(n,2)==1 | isreal(b), % odd case
    % Form intermediate even-symmetric matrix.
    ww = (sqrt(2*n)) * exp(j*(0:n-1)*pi/(2*n)).';
```

APPENDIX A-continued

```
    ww(1) = ww(1) * sqrt (2);
    W = ww(:,ones(1,m));
    yy = zeros(2*n,m);
    yy(1:n,:) = -W.*bb;
    yy(n+2:n+n,:) = -j*W(2:n,:).*flipud(bb(2:n,:));
    y = ifft(yy,2*n);
    % Extract inverse DST.
    a = y(1:n,:);
else % even case
    % Compute precorrection factor
    ww = sqrt(2*n) * exp(j*pi*(0:n-1)/(2*n)).';
    ww(1) = ww(1)/sqrt(2);
    W = ww(:,ones(1,m));
    % Compute x tilde using equation (5.93) in Jain
    y = ifft(W.*bb);
    % Re order elements of each column according to equations (5.93) and
    % (5.94) in Jain
    a = zeros (n,m)
    a(1:2:n,:) = -y(1:n/2,:);
    a(2:2:n,:) = -y(n:-1:n/2+1,:);
end
if isreal(b), a = imag(a); end
if do_trans. a = a.'; end
%%%%%
function b=dst(a,n)
%DST   Discrete sine transform.
%
%   Y = DST(X) returns the discrete sine transform of X.
%   The vector Y is the same size as X and contains the
%   discrete sine transform coefficients.
%
%   Y = DST(X,N) pads or truncates the vector X to length N
%   before transforming.
%
%   If X is a matrix, the DST operation is applied to each
%   column. This transform can he inverted using IDCT.
%
%   See also: FFT, IEFT, DCT, and IDCT.
%   Author(s): C. Thompson, 2-12-93
%             S. Eddins, 10-26-94, revised
%   Copyright (c) 1988-97 by The MathWorks, Inc.
%   $Revision: 1.14 $ $Date: 1997/02/06 21:52:37 $
%   Modified by ASG from DCT to DST. 1999/06/02
%   References:
%   1) A. K. Jain, "Fundamentals of Digital Image
%        Processing", pp. 150-153.
%   2) Wallace, "The JPEG Still Picture Compression Standard",
%        Communications of the ACM, April 1991.
error (nargchk(1,2,nargin));
if min(size(a))==1
    if size(a,2)>1
            do_trans = 1;
    else
            do_trans = 0;
    end
    a = a(:);
else
    do_trans = 0;
end
if nargin==1,
    n = size(a,1);
end
m = size(a,2);
% Pad or truncate a if necessary
if size(a,1)<n,
    aa = zeros (n,m);
    aa(1:size(a,1),:) = a;
else
    aa = a(1:n,:);
end
if rem(n,2)==1 | isreal(a), % odd case
    % Form intermediate even-symmetric matrix.
    y = zeros (2*n,m);
    y(1:n,:) = aa;
    y(n+1:n+n,:) = -flipud(aa);
    Perform FFT
    yy = fft(y);
    % Compute DST coefficients
    ww = (exp(-i*(0:n-1)*pi/(2*n))/sqrt(2*n)).';
```

APPENDIX A-continued

```
    ww(1) = ww(1) / sqrt(2);
    b = ww(:,ones(1,m)).*yy(1:n,:);
  else % even case
    % Re-order the elements of the columns of x
    y = [ aa(1:2:n,:); -aa(n:-2:2,:) ];
    % Compute weights to multiply DFT coefficients
    ww = 2*exp(-i*(0:n-1)*pi/(2*n))/sqrt(2*n);
    ww(1) = ww(1) / sqrt(2);
    W = ww(:,ones(1,m));
    % Compute DST using equation (5.92) in Jain
    b = W .* fft(y);
  end
  if isreal(a), b = imag(b); end
  if do_trans, b = b.'; end
```

What is claimed is:

1. A method for constructing a three dimensional model of an object comprising:

illuminating different regions of a display in sequence, wherein light from the illuminated regions of the display illuminates portions of the object;

obtaining a set of images of the object being illuminated by the different regions, an illuminated portion of the object in each image having a portion that substantially overlaps with an illuminated portion of the object in another image; and constructing the three dimensional model of the object based on the set of images.

2. The method of claim 1, wherein the different regions include at least three different regions.

3. The method of claim 2, wherein the step of constructing the three dimensional model further comprises finding an estimate of a set of light source vectors representing the different illuminated regions.

4. The method of claim 3, wherein the step of constructing the three dimensional model further comprises finding an estimate of the shape and albedo of the object based on the estimated set of light source vectors.

5. The method of claim 4, further comprising resolving an ambiguity in the estimate of the shape by transforming an estimated shape to a transformed shape that is consistent with an exemplar of the object being modeled.

6. The method of claim 5, wherein the exemplar of the object is a pre-calibrated exemplar that is constructed from a set of objects similar to the object being modeled.

7. The method of claim 5, further comprising resolving the ambiguity in the estimate of the shape by enforcing integrability on data representing the shape of the object.

8. The method of claim 1, wherein the set of images is obtained by a camera that is facing a direction relatively the same as the display.

9. The method of claim 8, wherein the camera is at a relatively fixed position in relation to the object.

10. The method of claim 1, wherein the object is a human face.

11. The method of claim 1, wherein the set of images are obtained while the object is relatively still.

12. A system for constructing a three dimensional model of an object comprising:

a display for showing different illuminated regions on the display in sequence and illuminating portions of the object by using light from the illuminated regions;

a camera for obtaining a set of images of the object being illuminated by the different illuminated regions, an illuminated portion of the object in each image having a portion that substantially overlaps with an illuminated portion of the object in another image; and a processor for constructing the three dimensional model of the object based on the set of images.

13. The system of claim 12, wherein the camera is facing a direction relatively the same as the direction of the display.

14. The system of claim 13, wherein the camera is at a relatively fixed position in relation to the object.

15. The system of claim 12, wherein the object is a human face.

16. The system of claim 12, wherein the processor constructs the three dimensional model by finding an estimate of a set of the light source vectors representing the illuminated region at different positions, and finding an estimate of the shape and albedo of the object based on the estimated set of light source vectors.

17. A computer program stored on a computer-readable media for causing a computer system to perform the functions of:

illuminating different regions of a display in sequence and illuminating portions of the object by using light from the illuminated regions;

obtaining a set of images of an object being illuminated by the different regions, an illuminated portion of the object in each image having a portion that substantially overlaps with an illuminated portion of the object in another image; and constructing a three dimensional model of the object based on the set of images.

18. The computer program of claim 17, further causing the computer system to perform the function of finding an estimate of a set of light source vectors representing the different illuminated regions.

19. The computer program of claim 18, further causing the computer system to perform the function of finding an estimate of the shape and albedo of the object based on the estimated set of light source vectors.

20. The computer program of claim 19, further causing the computer system to perform the function of resolving an ambiguity in the estimate of the shape by transforming an estimated shape to a transformed shape that is consistent with an exemplar of the object being modeled.

21. The computer program of claim 20, wherein the exemplar of the object is a pre-calibrated exemplar constructed from a set of objects similar to the object being modeled.

22. The computer program of claim 20, further causing the computer system to perform the function of resolving the ambiguity in the estimate of the shape by enforcing integrability on data representing the shape of the object.

23. The computer program of claim 17, wherein the object is a human face.

24. A system for playing a video game comprising:
 a display for showing illuminated regions in sequence at different positions on the display;
 a camera for obtaining a set of images of a user illuminated by the illuminated regions at different positions on the display; and
 a processor for constructing a three dimensional model of the user of the video game based on the set of images and constructing representations of the user within the video game based on the three dimensional model.

25. The system of claim 24, wherein the camera obtains a set of images of the user's face, and the processor constructs a three dimensional model of the user's face and compose representations of the user's face within the video game based on the three dimensional model.

26. A method of playing a video game comprising:
 illuminating different regions of a display in sequence;
 obtaining a set of images of a user being illuminated by the different regions of the display;
 constructing a three dimensional model of the user based on the set of images; and
 composing representations of the user based on the three dimensional model within the video game.

27. The method of claim 26, wherein the set of images of the user are a set of images of the user's face, and the processor constructs a three dimensional model of the user's face and composes representations of the user's face within the video game based on the three dimensional model.

28. A method comprising:
 obtaining a set of images of an object being illuminated by different regions of a display, each image showing the object having illuminated portions, an illuminated portion of the object in each image having a portion that substantially overlaps with an illuminated portion of the object in another image;
 constructing a three dimensional model of the object based on the set of images; and
 synthesizing two dimensional images of the object based on the three dimensional model.

29. A method, comprising:
 illuminating different regions of a display in sequence;
 obtaining a set of images of an object being illuminated by the different regions;
 finding an estimate of a set of light source vectors representing the different regions based on the set of images;
 finding an estimate of the shape and albedo of the object based on the set of images and the estimated set of light source vectors; and
 transforming an estimated shape to a transformed shape that is consistent with an exemplar of the object to resolve an ambiguity in the estimate of the shape.

30. The method of claim 29, wherein the exemplar of the object is a pre-calibrated exemplar that is constructed from a set of objects similar to the object.

31. A computer program stored on a computer-readable media for causing a computer system to perform the functions of:
 illuminating a region at different positions on a display in sequence;
 obtaining a set of images of an object being illuminated by the region at different positions on the display;
 finding an estimate of a set of light source vectors representing the different illuminated regions based on the set of images;
 finding an estimate of the shape and albedo of the object based on the set of images and the estimated set of light source vectors; and
 transforming an estimated shape to a transformed shape that is consistent with an exemplar of the object to resolve an ambiguity in the estimate of the shape.

32. The computer program of claim 31, wherein the exemplar of the object is a pre-calibrated exemplar constructed from a set of objects similar to the object.

* * * * *